Patented Sept. 22, 1931

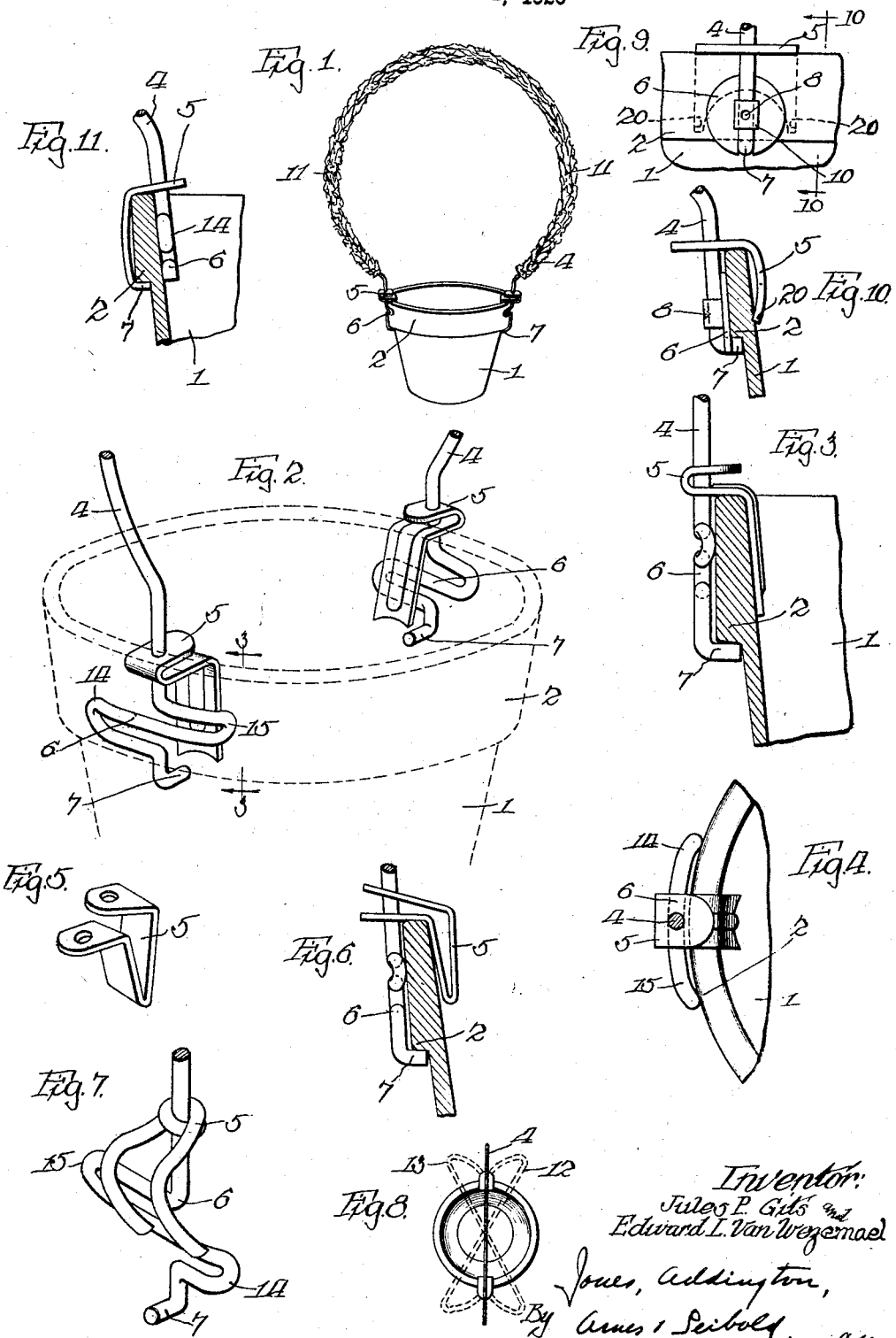

1,824,343

UNITED STATES PATENT OFFICE

JULES P. GITS AND EDWARD L. VAN WEZEMAEL, OF CHICAGO, ILLINOIS

FLOWERPOT HOLDER

Application filed June 1, 1926. Serial No. 112,758.

Our invention relates to an improved construction of flower-pot holder, and more particularly to an improved form of device adapted to be adjustably connected to pots of different sizes, and for holding these pots firmly and efficiently at said connections.

More specifically our invention provides a clamp, which is movable and adjustable upon the hanging-wire, and which is so formed that it will hold the pot securely and will not become disengaged by any twisting movement of the pot. The clamping device comprises an adjustable member fitting on the inside of the pot and pressing firmly against a stationary member having a laterally projecting portion adapted to engage under the outside flange of the pot. One outstanding advantage in this device is the fact that the more weight supported by the pot, the greater will be the pressure between the two members of the clamping device, thus making impossible a slipping or disengaging of the clamping means, such a disengagement often occurring where ordinary holders are used due to any increased weight, or to the twisting of the pot and hanging-wire.

The invention consists also in certain details of construction hereinafter fully described, and pointed out in the claims.

Referring now to the accompanying drawings, forming a part of this specification, Figure 1 is a perspective view of the pot-hanging device, showing a pot supported by the device.

Fig. 2 is an enlarged and detailed perspective view of the device applied to a pot, this figure showing merely one embodiment of our invention.

Fig. 3 is a cross-sectional view along the line 3—3 of Fig. 2.

Fig. 4 is a top plan of the clamping device, showing the hanging-wire in cross-section.

Fig. 5 shows another form of the sliding and adjustable member of the clamping device.

Fig. 6 is a cross-sectional view similar to that shown in Fig. 3 but with the form of clamping member shown in Fig. 5 substituted for the member shown in Fig. 1.

Fig. 7 shows still another type of clamping means embodying our invention.

Fig. 8 is a top plan demonstrating the manner in which the hanging-wire may be twisted without causing the clamping device to become disengaged from the pot.

Fig. 9 is an elevational detailed view of another embodiment of our invention.

Fig. 10 is a cross-sectional view along the line 10—10 of Fig. 9, and

Fig. 11 is an elevational detailed view of an alternative embodiment of our invention.

While we have shown various alternative embodiments of our invention in the drawings, it is to be understood that we intend employing either form whenever desirable, and, therefore, do not wish to be limited to any one form as a preferred form.

As shown in the drawings, 1 denotes a flower-pot to which the hanging-wire 4 is attached by suitable clamping means comprising two members, one a sliding and adjustable member 5, movable along the hanging-wire 4, and the other a stationary member 6 so formed as to permit of, say, a two-point contact with the pot and having a laterally projecting portion 7 to engage under the chime 2 of the pot when the clamping means is applied.

When the stationary member 6 is put in place with the laterally projecting portion 7 engaging under the chime 2, the adjustable member 5 is slid along the wire 4 and placed in position on the pot opposite to the member 6. It will be noted that the clamp may be placed neatly on a pot of any size, the sliding member being higher on the hanging-wire where the chime is deeper. It will be noted also that, as shown in Fig. 11, the sliding member 5 may be placed either inside or outside of the pot, and that in the latter case, the stationary member 6 is on the inside, and the laterally projecting means 7 is provided on the movable member 5.

Fig. 9 shows another practical embodiment of our invention. The stationary member 6 is a disc which rests against the chime 2 of the pot and retains in position the lower portion of the hanging-wire which runs longitudinally along the disc, and through a strap 10 integral with the disc 6, the said hanging-wire being held securely by tapping the strap slightly to form a burr 8. The movable member 5 is then moved into place opposite member 6, thereby securing the stationary member 6 to the pot.

It is obvious that since the hanging-wire bulges outwardly at its upper extremities as shown in Fig. 1, any added weight in the pot will force the opposite sides to come more closely together, thus forcing the movable clamping member 5 more and more firmly against the side of the pot, this in turn insuring against a disengagement of the clamping means due to the weight of the pot and contents; the clamping means becomes, therefore, more secure in direct proportion to the added weight. If desired, wire 4 may be in different form, or have wicker wound about it to give a more pleasing appearance.

Fig. 8 demonstrates clearly the effect of twisting the hanging-wire 4 into positions 12 and 13. The arm or contact point 14 of the clamping member 6, shown in Fig. 4, presses against the pot when the hanging-wire 4 is twisted into the position 12, and that arm prevents any further twisting. The arm or contact point 15 acts in like manner when the wire 4 is twisted to position 13. The movable clamping member 5 pressing against the pot holds the stationary member 6 firmly in position during this limited twisting. Thus the invention precludes any possibility of twisting the clamp from the pot.

The particular form of movable clamping member 5, shown in Figs. 9 and 10 should be noted. This member is provided with sharp edges or prongs 20, which function to dig into the side of the pot, particularly when any twisting occurs, so as to increase the engagement and insure against release. It will be observed that the weight of the pot also increases the engagement, this likewise tending to prevent any twisting movement from releasing the pot.

We find that the stationary member 6 and the movable clamp 5 may be provided in many different forms, and consequently, we do not intend limiting our invention to any particular form.

While we have described several embodiments of our invention, it is obvious that many modifications therein may occur to those skilled in the art, and we desire, therefore, that our invention be limited only by the scope of the appended claims and by the prior art.

We claim:

1. A flower-pot holder construction comprising a hanging-wire, a stationary clamping member associated with said hanging-wire, providing a multi-point engagement with the pot, a laterally projecting means for engaging under the chime of said pot, and an adjustably movable clamping member, slidable along the hanging-wire, adapted to engage the pot opposite to the stationary clamping member.

2. A flower-pot holder construction comprising a hanging-wire, a stationary member, said member comprising a disc secured to said hanging-wire, said hanging-wire providing at its lower extremity a laterally projecting means for engaging under the chime of the pot, and an adjustably movable clamping member, slidable along said hanging-wire, adapted to engage the pot opposite to the stationary clamping member.

3. A flower-pot holder construction comprising a hanging-wire, and clamping means on the end of said hanging-wire, said clamping means comprising a stationary member providing an engagement with the pot, laterally projecting means adapted for engaging under the chime of said pot associated with said stationary member, and a movable and adjustable member, slidable along said hanging-wire and adapted to engage the pot opposite to the stationary clamping member.

4. A flower-pot holder construction comprising a hanging-wire and clamping means associated therewith comprising a stationary member providing an engagement with the pot, laterally projecting means adapted for engaging under the chime of said pot integral with the said hanging-wire, and a movable and adjustable member, slidable along said hanging-wire and adapted to engage the pot opposite to the stationary clamping member.

5. A flower-pot holder construction comprising a hanging-wire, a clamping means associated with said hanging-wire comprising a stationary member providing a holding engagement with the pot, and a movable and adjustable member, slidable along said hanging-wire and adapted to engage the pot opposite to the stationary clamping member.

6. A clamp of the type described comprising a hanging-wire, a disc engaging against the object to be supported and having provisions for interengaging the wire, a lateral projection on the lower end of said wire for supporting engagement with the overhanging edge on said object, and an adjustable member carried by said wire for engaging a surface of the object opposite to that engaged by said disc.

7. An article of manufacture for the purpose described consisting of a tensional bow portion with terminal grips formed from a single wire and an automatic adjusting member, said terminal grips being adapted to be attachingly associated with the rim and flange of a flower pot, frictional means on each gripping member coacting with the tension of the bow portion to adjustingly lock the gripping terminals to the pot.

8. A handle for vessels having a flanged rim such as a flower pot, consisting of a single piece of wire formed to be mountably associated with the vessel's flanged rim, a fulcrum member associated with the wire member adapted to form a leverage relation between the bow portion of the handle and the attaching portion, and also adapted to automatically adjust the attaching portion to the size of the flanged rim.

9. A demountable pot handle of the character described comprising a bowed member having each of its ends formed to attach to the rim of the pot, the said ends being formed to straddle the rim of the pot, and means at the lower extremity of each end engaging the inner and outer sides of the pot, said means being provided with a bite for holding engagement with the inner side of the pot and arranged to coact with the engagement on the outer side of the pot to provide an adjustable demountable lock fitting variant pot rims.

10. A demountable pot rim of the character described comprising a bowed member having terminal grips formed to attach to opposite sides of the rim of a pot, the said terminal grips being so formed as to straddle the rim of the pot with opposing members engaging the inner and outer sides of the pot, the inner member being provided with a bite to engage the inner side of the pot and coacting with the outer member to provide a self-adjusting demountable lock fitting variant pot rims.

11. In a device of the class described, a demountable pot handle consisting of resilient wire formed to straddle the flanged rim of a pot, there being means for locking itself to the said pot flange, and means to automatically vertically adjust its locking mechanism to variant pot flanges.

12. A handle adapted to grip the rim of a pot, said handle consisting of a resilient metal rod, being a bow form having each end formed to attach to opposite sides of the rim of a pot, the said ends being so formed as to straddle the rim of a pot and including means to adjust vertically each end to the said flower pot rim and demountably lock it thereto.

13. An article of manufacture for the purposes specified consisting of a resilient bow portion and terminal grips, said terminal grips being adapted to be attachingly associated with the rim of a flower pot, so formed that a plural bearing surface may be had on the outer surface of the pot rim, the grips held in gripping position by their coaction with the tension of the bow portion, and having a locking portion on the inside of the pot.

14. An article of manufacture comprising a demountable handle for vessels of variant rim sizes consisting of wire so formed that it comprises a bow portion, there being an attaching means at either end of the bow portion, each said attaching means consisting of a pair of friction members adapted to act against the inside and the outside walls of the vessel rim, one of the frictional members comprising means to secure a broad multiplied bearing surface, the other of the frictional members comprising means to automatically adjust the grips to vessel rims of variant sizes.

15. An article of manufacture comprising a demountable handle for vessels of variant rim sizes consisting of wire so formed that it comprises a bow portion, there being an attaching means at either end of the bow portion each said attaching means consisting of a pair of friction members adapted to act against the inside and the outside walls of the vessel rim, one of the frictional members comprising means to secure a broad multiplied bearing surface engaging one side of the vessel rim, the other of the friction members terminally coacting with the first frictional member and comprising a bite so arranged as to engage the opposite side of the vessel rim and automatically take up any variation in the size of the vessel rim.

16. A handle of the character described embodying a resilient bow member comprised in a rod having terminal grips adapted to engage the rim of a flower pot at diametrically opposite points, each of said grips consisting of a portion formed from the terminals of the bow member combined with a member loosely mounted upon the bow member, said loosely mounted member consisting of an angular piece of metal having a hole perforating one of the sides of the angular member; the bow member being passed through the perforation in the angular member, the said terminal of the bow member being bent at an angle to be brought under the ledge of the flange of the flower pot, whereby when the angle member is permitted to drop down under the rim of the flower pot, one flange of the angular member passing along the inner wall of the flower pot, and co-acting with the tensional resiliency of the bow member locks the handle of the flower pot.

17. A handle of the character described embodying a resilient bow portion and end formations bent inwardly at substantially right angles adapted to pass under the flange of a flower pot; associated therewith on each end an angular member having a perforation in one angular side thereof and adapted to receive therethrough a terminal of the bow portion, the said angular member being adapted to be brought into relation to the inside of the flower pot; the perforation in the angular member being so adjusted that when the angular member is brought into position where an angular portion thereof is brought into frictional relation with the inside of the flower pot, the bow member is thereby brought into locked relation with the flange of the flower pot.

18. An article of manufacture for the purpose described consisting of a resilient bow portion, and terminal grips formed from the ends of the bow portion in combination with locking members; the said bow portion terminals bent at a right angle to the body thereof and inwardly turned toward each other; angular members, one side of each of which is perforated, the other side adapted to lie adjacent to the inner wall of a flower pot when adjusted to the pot; the terminals of the bow member passing through the perforations in the angular members so that the angular members move freely up and down upon the bow member, the perforations in the angular members being so designed that when the angular members are brought down into position, the device is locked to the pot.

19. An article of manufacture for the purpose specified consisting of a resilient bow portion and terminal grips formed from a piece of resilient wire in combination with angular, metallic members; said terminal grips being adapted to be attachingly associated with the rim and flange of a flower pot; the bow portion terminals bent at a right angle and inwardly turned toward each other, the angular members floating upon the bow member and having means whereby when the bent ends of the bow member are in position under the flange of the flower pot, the angular members by being pressed down to a point where their flanged sections are adjacent the inner side of the pot, the device is locked to the rim of the pot and held in position automatically by the combination of the angular member with the resiliency of the bow member.

20. A handle of the character described consisting of a resilient bow member having terminal portions inwardly bent at substantially right angles adapted to be positioned under the rim of a flower pot, a locking device co-acting with the resilient bow member consisting of an angular member having a hole perforating one of its extensions whereby the bow member is associated with the angular member; means whereby when the angular member is pressed down upon the flange of the flower pot the bow member is resiliently locked to the flange of the flower pot.

21. A flower pot holder comprising a resilient bow member and an angular member slidably mounted thereon, the bow member having its terminal portions bent at substantially right angles and the said bent portions turned toward each other; slidably mounted on the bow portion at either end, angular members having means adapted to bear upon the inside of the pot when the bent end of the bow portion is passed under the ledge of the flower pot, whereby to resiliently lock the ends of the device to the flower pot.

22. A device for the purposes described comprising a resilient wire bent in the form of a bow having its terminals inwardly bent facing each other and adapted to be placed against the outer portion of the flange of a flower pot, the bent ends directed under the flange of the flower pot, slidably mounted upon and associated with the bow member, angular members having flanged portions adapted to be brought into contact with the inner walls of the flower pot; the flanged members being so adapted that when pressed downwardly they co-act with the bow member to resiliently lock the bow member to the flower pot.

In witness whereof, we have hereunto subscribed our names.

JULES P. GITS.
EDWARD L. VAN WEZEMAEL.